(12) United States Patent
Yie

(10) Patent No.: US 6,588,724 B2
(45) Date of Patent: Jul. 8, 2003

(54) ON-OFF VALVES FOR HIGH PRESSURE FLUIDS

(75) Inventor: Gene G. Yie, Grants Pass, OR (US)

(73) Assignee: Jetec Company, Grant Pass, OR (US)

( * ) Notice: Subject to any disclaimer, the term of this patent is extended or adjusted under 35 U.S.C. 154(b) by 93 days.

(21) Appl. No.: 09/930,047

(22) Filed: Aug. 15, 2001

(65) Prior Publication Data

US 2003/0034468 A1 Feb. 20, 2003

(51) Int. Cl.[7] ............................................... F16K 31/12
(52) U.S. Cl. ............................ 251/34; 251/38; 251/77
(58) Field of Search ........................... 251/30.03, 30.04, 251/77, 78, 34, 37, 38, 129.02, 28

(56) References Cited

U.S. PATENT DOCUMENTS

| | | | | |
|---|---|---|---|---|
| 1,229,726 A | * | 6/1917 | Ebeling | 251/38 |
| 1,885,846 A | * | 11/1932 | Littlefield | 251/38 |
| 2,169,044 A | * | 8/1939 | Goehring | 251/38 |
| 2,496,553 A | * | 2/1950 | Littlefield | 251/30.04 |
| 2,604,905 A | * | 7/1952 | Myer | 251/38 |
| 2,805,038 A | * | 9/1957 | Towler et al. | 251/38 |
| 3,100,103 A | * | 8/1963 | Bullard | 251/38 |
| 3,633,868 A | * | 1/1972 | Catania | 251/30.03 |
| 3,799,497 A | * | 3/1974 | Zeuner | 251/30.03 |
| 3,903,919 A | * | 9/1975 | Zeuner | 251/30.03 |
| 4,526,340 A | * | 7/1985 | Kolchinsky et al. | 251/77 |
| 4,555,872 A | | 12/1985 | Yie | |
| 4,592,533 A | * | 6/1986 | Guglielmi et al. | 251/77 |
| 4,765,540 A | | 8/1988 | Yie | |
| 4,768,709 A | | 9/1988 | Yie | |
| 4,862,911 A | | 9/1989 | Yie | |
| 5,117,872 A | | 6/1992 | Yie | |
| 5,186,393 A | | 2/1993 | Yie | |
| 5,241,986 A | | 9/1993 | Yie | |
| 5,297,777 A | | 3/1994 | Yie | |
| 5,524,821 A | | 6/1996 | Yie | |
| 5,794,854 A | | 8/1998 | Yie | |
| 5,799,688 A | | 9/1998 | Yie | |
| 5,879,137 A | | 3/1999 | Yie | |
| 5,927,329 A | | 7/1999 | Yie | |
| 6,179,574 B1 | | 1/2001 | Yie | |
| 6,293,513 B1 | * | 9/2001 | Birkelund | 251/77 |

* cited by examiner

Primary Examiner—Ehud Gartenberg
Assistant Examiner—John Bastianelli
(74) Attorney, Agent, or Firm—Pauley Petersen Kinne & Erickson

(57) ABSTRACT

An on-off valve that operates between an open position and a closed position, particularly with high-pressure working fluids. has a valve body that defines a valve cavity. A valve poppet is slidably mounted within the valve cavity. A bushing is mounted with respect to the valve body and divides the valve cavity into a first chamber and a second chamber. One end of the valve poppet is positioned within the first chamber and an opposite end of the valve poppet is positioned within the second chamber. A spring urges the valve poppet into the first chamber. An actuating pin is slidably mounted with respect to the valve body. In the closed position, the actuating pin seals the passage of the valve poppet. An actuator is used to operate the actuating pin between the open position and the closed position of the on-off valve.

15 Claims, 10 Drawing Sheets

ON-OFF VALVES FOR HIGH PRESSURE FLUIDS

BACKGROUND OF THE INVENTION

1. Field of the Invention

This invention relates to an on-off valve which instantly operates between an open position and a closed position. The on-off valve of this invention is particularly suitable for high-pressure fluid systems and/or those that operate with an incompressible fluid.

2. Description of Prior Art

On-off valves are commonly used to control fluid flow. There are many types of valves suitable for fluids, gas or liquid, operating at low fluid pressures. As the fluid pressure increases, the availability of suitable valves narrows. At high fluid pressures, the selection of suitable conventional valves is significantly restricted. At pressures above 10,000 psi, which are common in water jetting processes, the suitable conventional on-off and pressure-regulating valves are reduced to a few needle valves, poppet valves, stem valves, and ball valves. These valve names indicate the shape of an internal key valving element. When the water pressure is further increased to above 20,000 psi, only stem valves, needle valves, and poppet valves can withstand the high stresses induced by the pressurized fluid.

There are several reasons why high-pressure fluid, particularly water, pose problems for valves. On-off valves commonly include a valve cavity having an inlet and an outlet, an elongated valve stem having one end inside the valve cavity and an other end outside the valve cavity, a valve port shaped to mate with the internal end of the valve stem and connected to the valve outlet, and a source of outside force connected to the external end of the valve stem, as shown in FIG. 1. The outside force is used to raise or lower the valve stem so as to close or open the valve port. One common outside force is generated by a human hand working on a lever to rotate the valve stem, which is supported by threads between the valve stem and the valve body. To close the valve, the valve lever is rotated clockwise, for example, to lower the valve stem until a tip of the valve stem tightly engages the valve port. To open the valve, the valve lever is rotated counterclockwise to raise the valve stem and to open the port. Because of the hand motion involved, the valve lever generally is rotated a quarter turn at a time. If the threads around the valve stem are fine, the valve port is generally opened quite slowly. Thus the fluid will gush out of the valve port when first opened. When the fluid is water at very high pressures, severe erosion of valve stem and valve port can occur. Once eroded, a greater outside force is required to close the valve. This excessive force can deform valve parts and if so, the valve will not perform its duty. To avoid such situation, the valve port should be opened more quickly, particularly when the fluid pressure is very high and the fluid is incompressible, such as water. In other words, the on-off valve should be open or closed instantly.

Providing a fast on-off valve operation requires a linear motion on the valve stem and the slow rotation will not suffice. This linear motion can be easily applied to a valve stem at low fluid pressures. At very high fluid pressures, this task becomes very difficult. For example, a 0.125 inch diameter valve stem positioned in a valve cavity filled with 30,000-psi water will be pushed out by a force of about 368 $lb_f$. To push this valve stem into the valve cavity, an outside force greater than 368 $lb_f$ must be applied to the external end of this 0.125 inch diameter valve stem. This force is practical if compressed air or pressurized oil is the source and is applied by an actuator, but impractical if it is applied by a hand of a human operator. Further, the strength and support of this valve stem also become critical factors. The pounding between the valve stem and its mated port is also a concern if the valve has frequent operation. As a result, there is no good conventional instant on-off valve for use with water at very high pressures. It is one object of this invention to solve these problems by providing suitable valves.

In water jetting operations, a valve must frequently interrupt the water stream. To minimize the outside force required, the diameter of the valve stem is often very small. For example, a waterjet at 55,000 psi is currently used in industrial material-cutting operations and the waterjet must be interrupted frequently with an instant on-off valve having a compressed air operated actuator. The valve stem is commonly about 0.078 inches in diameter and mates with a valve port about 0.045 inches in diameter. This diameter ratio results in a cross-sectional area of about 0.003 square inches available for generating a valve stem lifting force necessary to open the valve, if compressed air is used only in closing the valve. This valve-lifting force fades away as the valve stem and the valve port become worn. Further, the small valve port required by a small valve stem is incompatible with many water jetting processes that require high flow rates, such as cleaning ship hulls with waterjets. It is another object of this invention to provide on-off valves without such flow rate restrictions.

SUMMARY OF THE INVENTION

Another problem with conventional on-off valves used in high-pressure water jetting processes is a frequent pounding between the valve stem and the valve port. Because the valve operating force is applied directly to the valve stem and then transmitted to the valve port upon contact, failure of these two parts will occur soon if the contact is frequent. It is highly desirable to soften the contact to eliminate severe pounding of the valving parts, particularly at high fluid pressures. It is another object of this invention to provide on-off valves that have no pounding or that significantly reduce pounding of valve parts.

Automatic pressure regulating valves are very useful in pressurized fluid systems and are often a safety valve of the system. In water jetting operations, water flow is often interrupted while the pump is driven by a diesel engine that typically operates at a constant speed. Therefore, a reliable bypass valve that can sense system pressure changes and automatically bypass a predetermined amount of water to maintain a constant system pressure is of significant value. In many waterjet cleaning operations, the water flow must be interrupted frequently. Thus, the bypass valve will also be frequently operated on and off. A conventional spring-operated pressure regulating valve is illustrated in FIG. 2, which is similar in construction to the conventional manual on-off valve illustrated in FIG. 1, except that a constant outside force from a compressed spring is applied to the valve stem. The valve stem has a diameter greater than the diameter of the valve outlet port to create a cross-sectional area differential and to generate a prescribed valve lifting force $F_f$. When the compression spring is set against a prescribed fluid pressure $P_f$, the valve port is closed. When the fluid pressure is increased beyond $P_f$, the fluid induced force $F_f$ is increased, thus causing the valve stem to move up and to release some fluid. As soon as the fluid pressure is restored to below $P_f$, the valve stem will again move down to close the valve port. This conventional setup is a main component of pressure-relief valves used in water jetting processes, despite its many known shortcomings. One serious shortcoming is the change and ultimately loss of the valve opening capability from erosion and wear of the valve stem and its mated valve seat, a situation shared by manual on-off valves.

It is one object of this invention to provide an on-off valve for use with all types of fluid, particularly incompressible fluids, at a wide range of operating pressures.

It is another object of this invention to provide an on-off valve that can be easily operated by forces generated by a human hand or foot, even at very high operating fluid pressures.

Another object of this invention is to provide an automatic valve for pressure regulating applications in high-pressure water jetting processes.

BRIEF DESCRIPTION OF THE DRAWINGS

This invention can be better understood when the specification is taken in view of the drawings, where.

DESCRIPTION OF PREFERRED EMBODIMENTS

Figure 3:
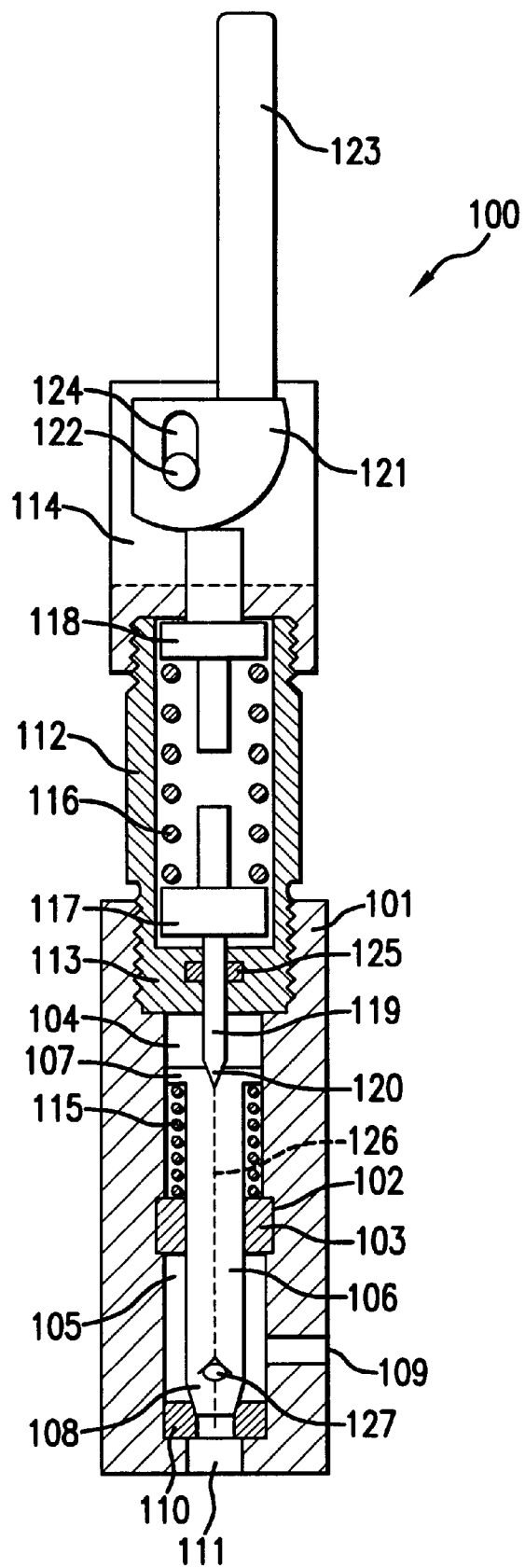
FIG. 3 is a partial cross-sectional view of an on-off valve and an actuator, shown in a closed position, according to one preferred embodiment of this invention.

FIG. 3 shows one embodiment of this invention as a lever-operated on-off valve suitable for human hand operation, even at a wide range of fluid pressures. Valve 100 of this invention has valve body 101, cylindrical valve cavity 102 divided by bushing 103 into upper chamber 104 and lower chamber 105. A cylindrical valve poppet 106 straddles bushing 103 and has end portion 107 positioned in chamber 104 and opposite end portion 108 positioned in chamber 105. Valve inlet 109 is in communication with chamber 105. Valve seat 110 inside chamber 105 has a bore in communication with valve outlet 111. Spring cylinder 112 is engaged by threads or other connection means to valve body 101 at end 113 to plug or seal chamber 104 in a fluid-tight manner. Cam housing 114 is attached to an opposite end of spring cylinder 112. Compression spring 115 is positioned inside chamber 104 around valve poppet 106 and urges valve poppet 106 into a position disengaged from valve seat 110. Compression spring 116 is positioned inside spring cylinder 112 and abuts spring piston 117 at one end and abuts a cam piston 118 at an opposite end. Valve actuating pin 119 has tapered end 120 positioned inside chamber 104 and the other end abutting spring piston 117. Cam disk 121, positioned inside cam housing 114, is rotatable around axial element 122 and constantly contacts cam disk 118. Valve lever 123 is attached to cam disk 118. Slot 124 within cam disk 119 accommodates axial element 122. Seal assembly 125 is positioned around actuating pin 116.

Still referring to FIG. 3, cam disk 121 of valve 100 of this invention is shaped so that its rotation around axial element 122 results in a linear movement of cam piston 118 along a central axis of valve cavity 102. Cam piston 118 moves between a high position and a low position. In the high position spring 116 is extended and in the low position spring 116 is compressed. Movement of cam piston 118 causes spring piston 117 to move accordingly, which causes valve actuating pin 119 to move in and out of chamber 104. At the high position, pin 119 is retracted from chamber 104. At the low position, pin 119 is extended into chamber 104 and engages end portion 107 at a central location. Valve poppet 106 has a central fluid passage 126 that extends from end portion 107 to end portion 108 and has check valve 127 therebetween to limit the fluid flow only from chamber 104 to chamber 105 but not from chamber 105 to chamber 104. Tapered end 120 of valve pin 119 engages fluid passage 126 so that passage 126 is closed when these two parts are engaged and open when disengaged. Bushing 103 is positioned around valve poppet 106 snugly but not in a fluid tight manner, allowing valve poppet 106 to slide up and down and a fluid to slowly flow across bushing 103. A bore within bushing 103 can be sized and/or dimensions of valve poppet 106 can be sized to allow a selected or predetermined amount of the working fluid to flow from chamber 105, between bushing 103 and valve poppet 106, and into chamber 104. End portion 108 may be tapered to fit within valve seat 110 in a fluid-tight fashion.

Still referring to FIG. 3, cam disk 121 of valve 100 of this invention may have a simple round hole to accommodate axial element 122 so that cam disk 121 is stable only at one position, or cam disk 121 may have slot 124 within which axial element 122 is positioned to provide two stable positions. As shown in FIG. 3, valve 100 is in an assembled condition, a condition in which there is no working fluid in the valve cavity. In this position, spring 116 is slightly compressed and cam piston 118 is at its high position and spring piston 117 is at its low position, forcing pin 119 to engage valve poppet 106 and to push valve poppet 106 down to close valve outlet 111. FIG. 3 shows valve 100 in a normally closed position. However, if spring 115 is of sufficient strength to exert a force strong enough to overcome the downward force from spring 116, then valve outlet 111 can be open at this position. This is simply a design option, allowing valve 100 to be normally open or normally closed.

Figure 4:
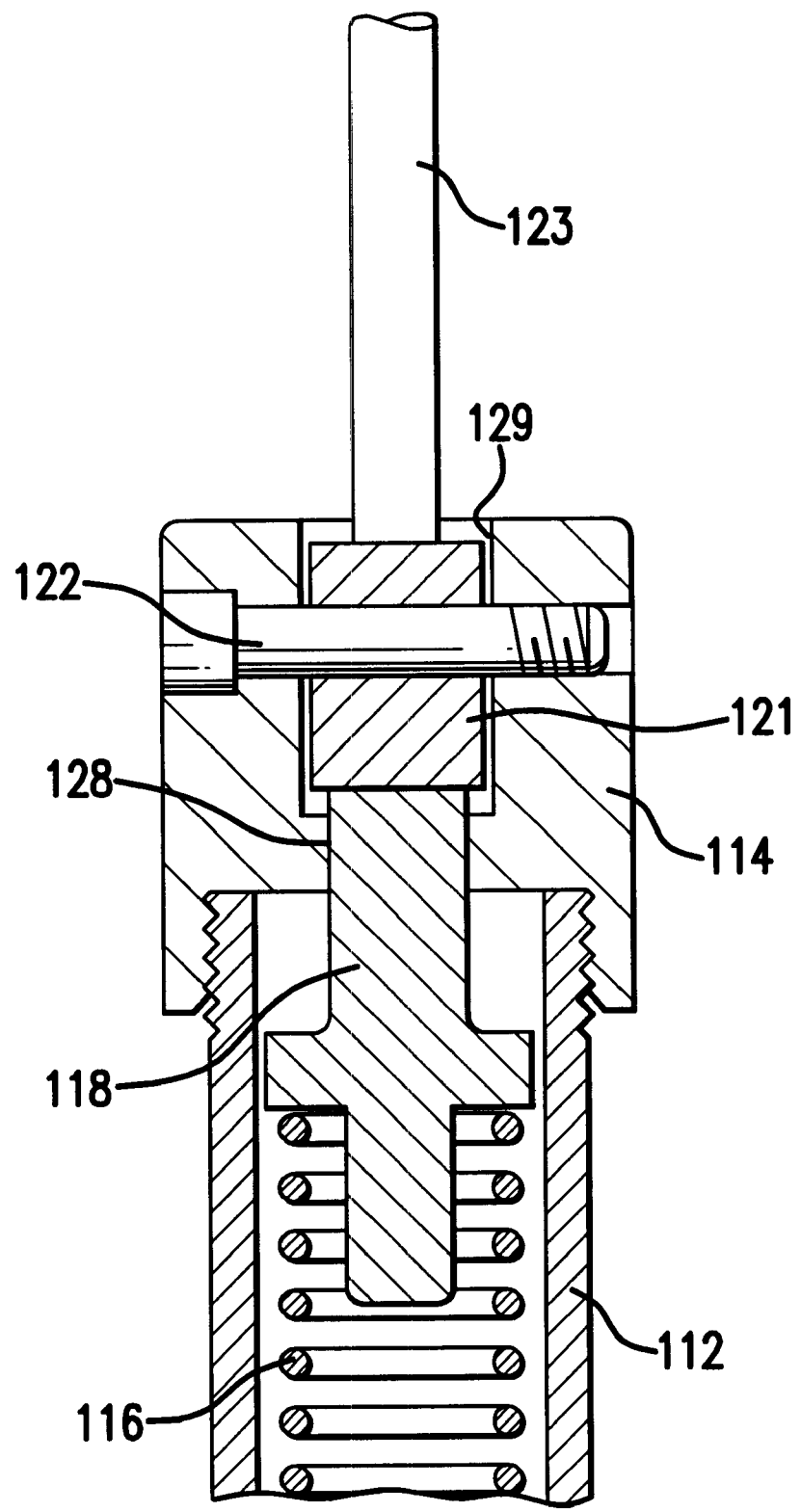
FIG. 4 is a partial cross-sectional partial view of an actuator, according to one preferred embodiment of this invention.

Referring to FIG. 4, the cam disk arrangement of valve 100 is illustrated in more detail. Cam housing 114 is attached to spring cylinder 112, preferably by a threaded arrangement at one end. Cam housing 114 has center hole 128 to accommodate cam piston 118, and slot 129 across the diameter at the other end accommodates cam disk 121. Bolt 122 serves as a rotating axis for cam disk 121. FIG. 4 shows cam piston 118 at its lowest position and spring 116 is compressed.

Figure 5:
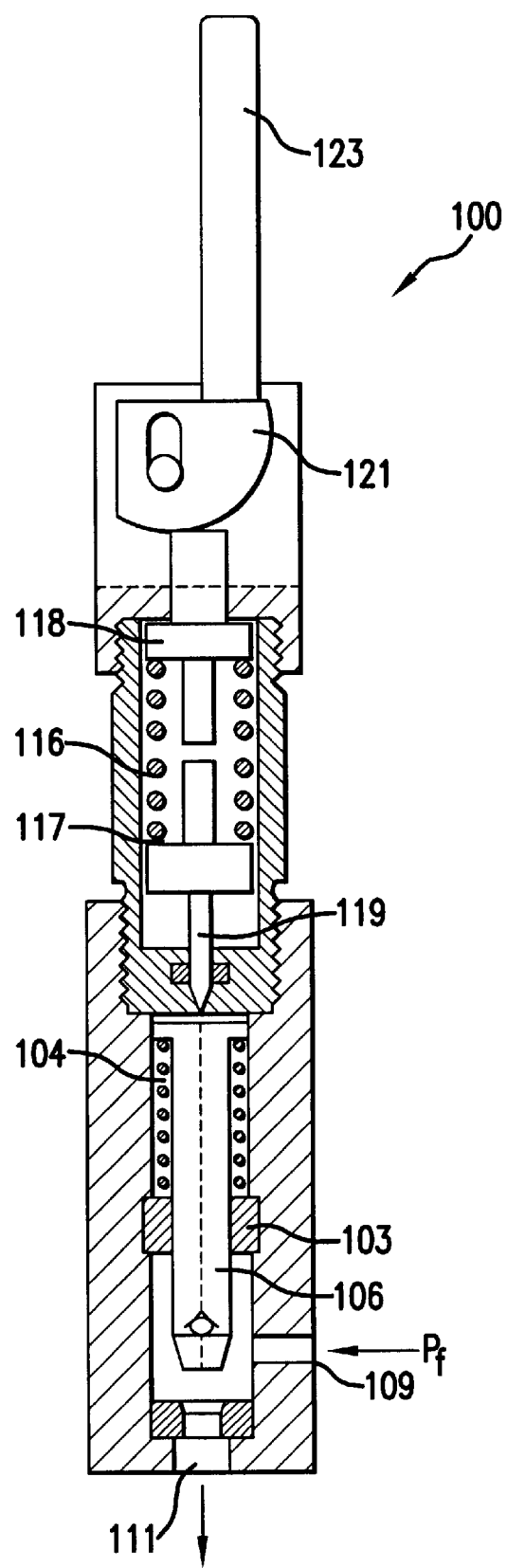
FIG. 5 is a partial cross-sectional view of the on-off valve with the actuator as shown in FIG. 3, but in an open position.

Referring to FIG. 5, when a pressurized fluid enters into valve 100 at a pressure $P_f$, it flows into chamber 104, between bushing 103 and valve poppet 106 and pushes pin 119 upward, thus allowing valve poppet 106 to move up and to open valve outlet 111. Valve 100 is now at its open position and the fluid flows freely through the valve cavity. At this position, pin 119 is retracted fully by the fluid force and spring piston 117 is pushed up to compress spring 116. Spring piston 117 may abut cam piston 118 if necessary. The technical requirements of compression of spring 116 depend on the spring involved, the fluid pressure, and the size of pin 119. This is a stable position as cam disk 121 is at rest. Valve lever 123 can be positioned vertically or horizontally depending on the preference. To close valve 100, lever 123 is rotated a quarter turn, or at a specified angle depending on the design of cam disk 121.

Figure 1:
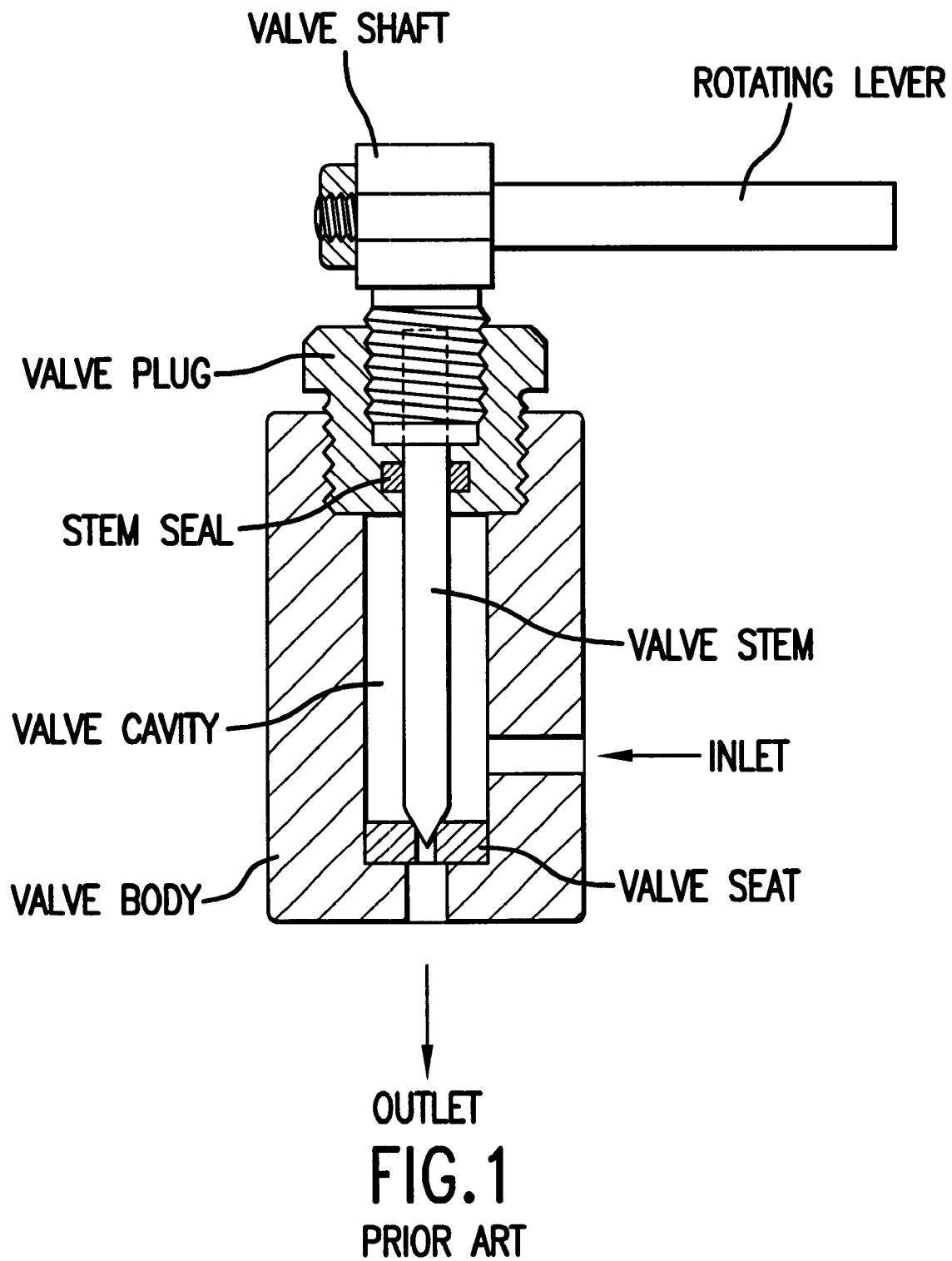
FIG. 1 is a partial cross-sectional view of a conventional on-off valve.
Figure 6:
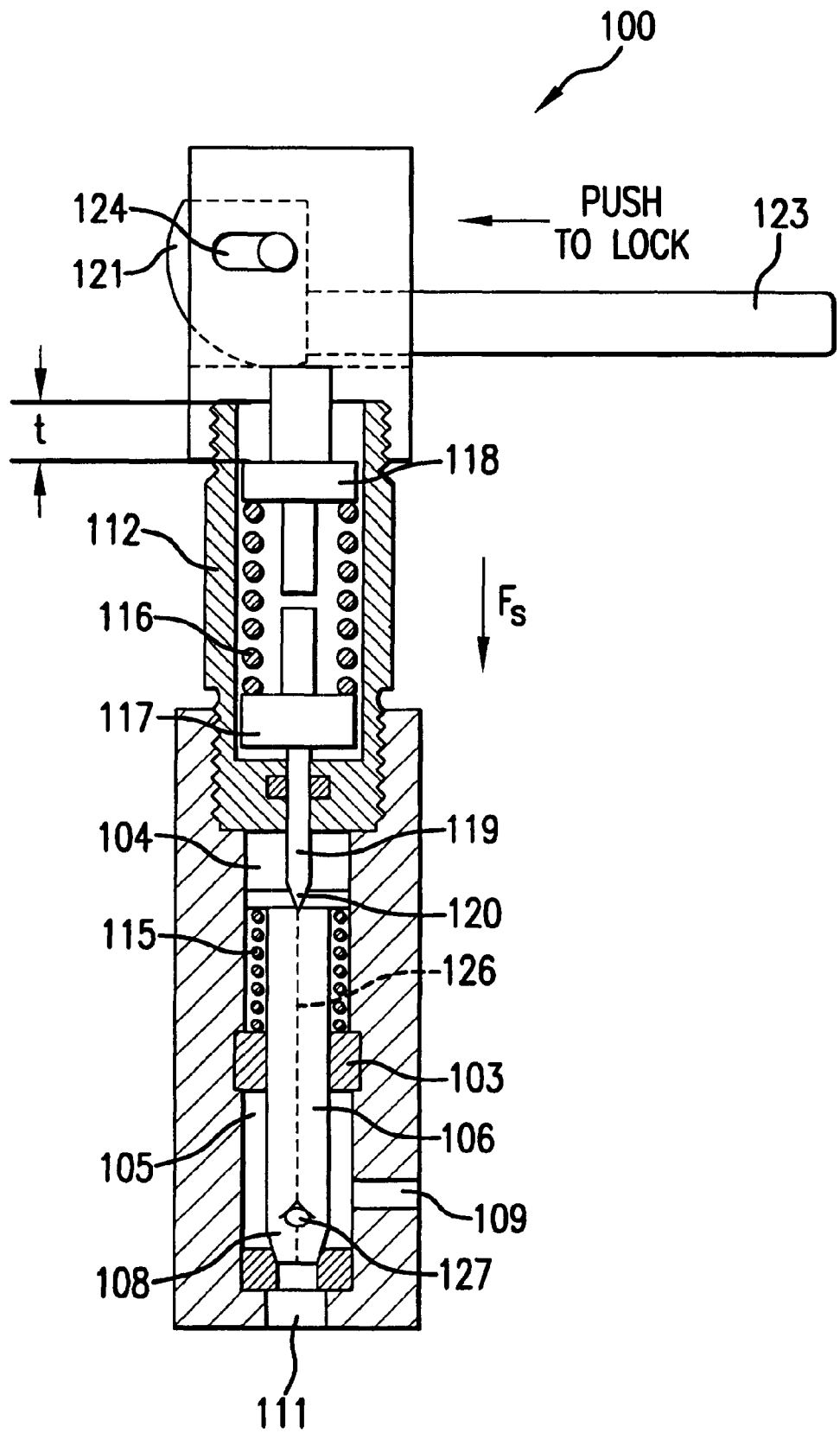
FIG. 6 is a partial cross-sectional view of an on-off valve and an actuator, in a closed position, according to another preferred embodiment of this invention.

Referring to FIG. 6, valve 100 is in a closed position when cam disk 121 is rotated to push cam piston 118 to its lowest position, thus compressing spring 116, which exerts a force upon spring piston 117 and pin 119. Pin 119 thus enters into chamber 104, engages valve poppet 106 at the entrance of passage 126, and pushes valve poppet 106 down to close outlet 111. At this position, pin tip 120 closes passage 126 and end portion 108 closes outlet 111. The fluid in chamber 104 exerts a full force on valve poppet 106 to close outlet 111. The force required to close passage 126 with pin 119 is supplied by spring 116, which travels a distance t, as shown in FIG. 6. To assure secured valve closure, the bias force of spring 116 must be adequate. Thus, the selected spring material must have a spring rate so that a compression distance t produces a force greater than the force exerted on pin 119 by pressurized fluid in chamber 104. Once a suitable spring 116 is installed, the required compression distance t can be readily supplied by movement of a small cam disk and a relatively short lever. By having a suitable slot within cam disk 121, pushing valve lever 123 from right to left, as shown in FIG. 6, will position cam disk 121 at a stable position and lock valve 100 in a closed position. With this invention, valve actuating pin 119 is not subjected to excessive forces that can cause damage. The pin assembly essentially floats between spring 116 and the fluid inside the valve cavity, unlike the rigid valve stems of conventional valves shown in FIG. 1. This invention allows an on-off valve to be actuated by forces generated from a human hand very quickly even at very high fluid pressures. There is no need to limit the flow rate as a relatively large valve outlet can be installed in a relatively small valve assembly.

Still referring to FIG. 6, to open valve 100 requires only lifting valve lever 123 to its vertical position shown in FIG. 3. Then the pressurized fluid in chamber 104 pushes pin 119 upward and flows through passage 126 to the outside of outlet 111. Chamber 104 thus loses its pressure and the force holding down valve poppet 106. Simultaneously, the fluid inside chamber 105 is still at full pressure and exerts a considerable force on end portion 108 in an upward direction. Therefore, valve poppet 106 will quickly move up, thus opening valve outlet 111. The check valve arrangement 127 inside valve poppet 106 prevents the fluid from flowing back into chamber 104, through passage 126. The fluid travels around bushing 103 to reach chamber 104, which takes more time because of the flow restrictions. This time delay allows valve poppet 106 to move up fully before it is balanced again in the fluid. Spring 115 assists this effort.

Still referring to FIG. 6, a close examination of valve 100 shows that it is a pilot-operated valve in which there is a pilot fluid circuit linking the two fluid chambers 104 and 105. By manipulating the pressure inside the two chambers 104 and 105, a force inbalance is created to move a relatively large valve poppet. The pilot circuit comprises central fluid passage 126 of valve poppet 106, chamber 104, the fluid passage around bushing 103, and chamber 105. Valve actuating pin 119 controls the pilot circuit flow in a prescribed direction. Valve poppet 106 should slide smoothly at all times. Thus bushing 103 is preferably made of a relatively soft bearing material and is smooth. Restricted fluid flow across bushing 103 is not preferred, particularly with incompressible fluid such as water at high pressures. It is possible to have a separate channel for flow from chamber 105 to chamber 104.

Figure 7:
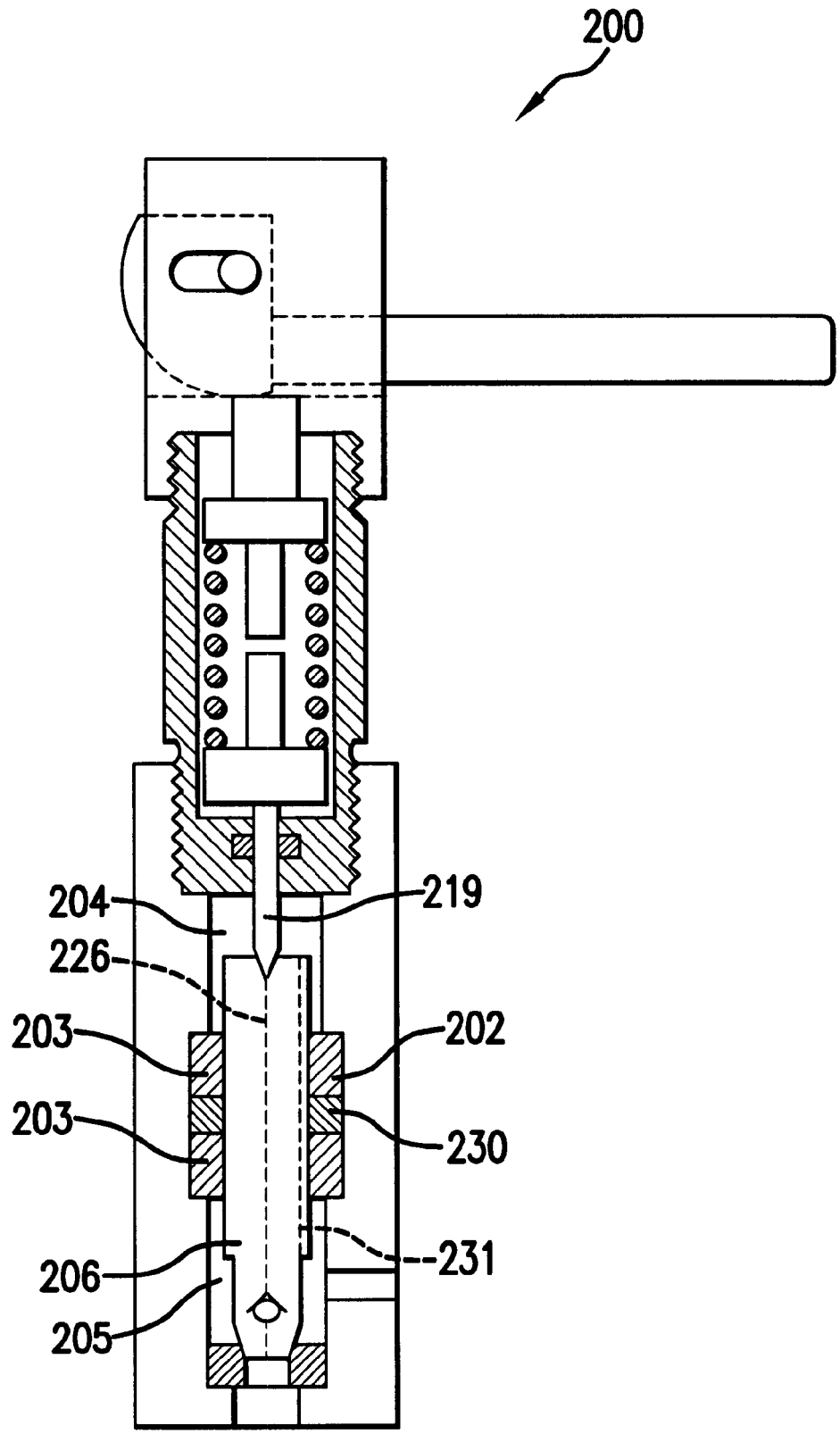
FIG. 7 is a partial cross-sectional view of an on-off valve and an actuator, according to another preferred embodiment of this invention.

Referring to FIG. 7, valve 200 represents another embodiment of this invention having a dedicated pilot fluid passage. Valve 200 is a manually operated on-off valve capable of high pressure operations. Valve 200 is similar to valve 100, except that the valve poppet and the valve bushing are different. Valve 200 has a bushing assembly comprising bushings 203 and seal 230. This assembly separates valve cavity 202 into upper chamber 204 and lower chamber 205. The fluid does not flow from chamber 205 to chamber 204 through the bushing assembly. Instead, the fluid flows through a relatively small fluid passage 231 within valve poppet 206, which can be parallel to central fluid passage 226. Fluid passage 231 is long enough to always connect the two chambers 204 and 205 but it is comparatively smaller to allow chamber 104 to lose pressure momentarily when passage 226 is opened. With this arrangement, valve poppet 206 can be made with a relatively hard material while bushing 203 is made of a relatively softer material. Seal 230 prevents erosion of the soft bushings. Seal 230 can be made of common polymeric seal materials.

EXAMPLE

Figure 8:
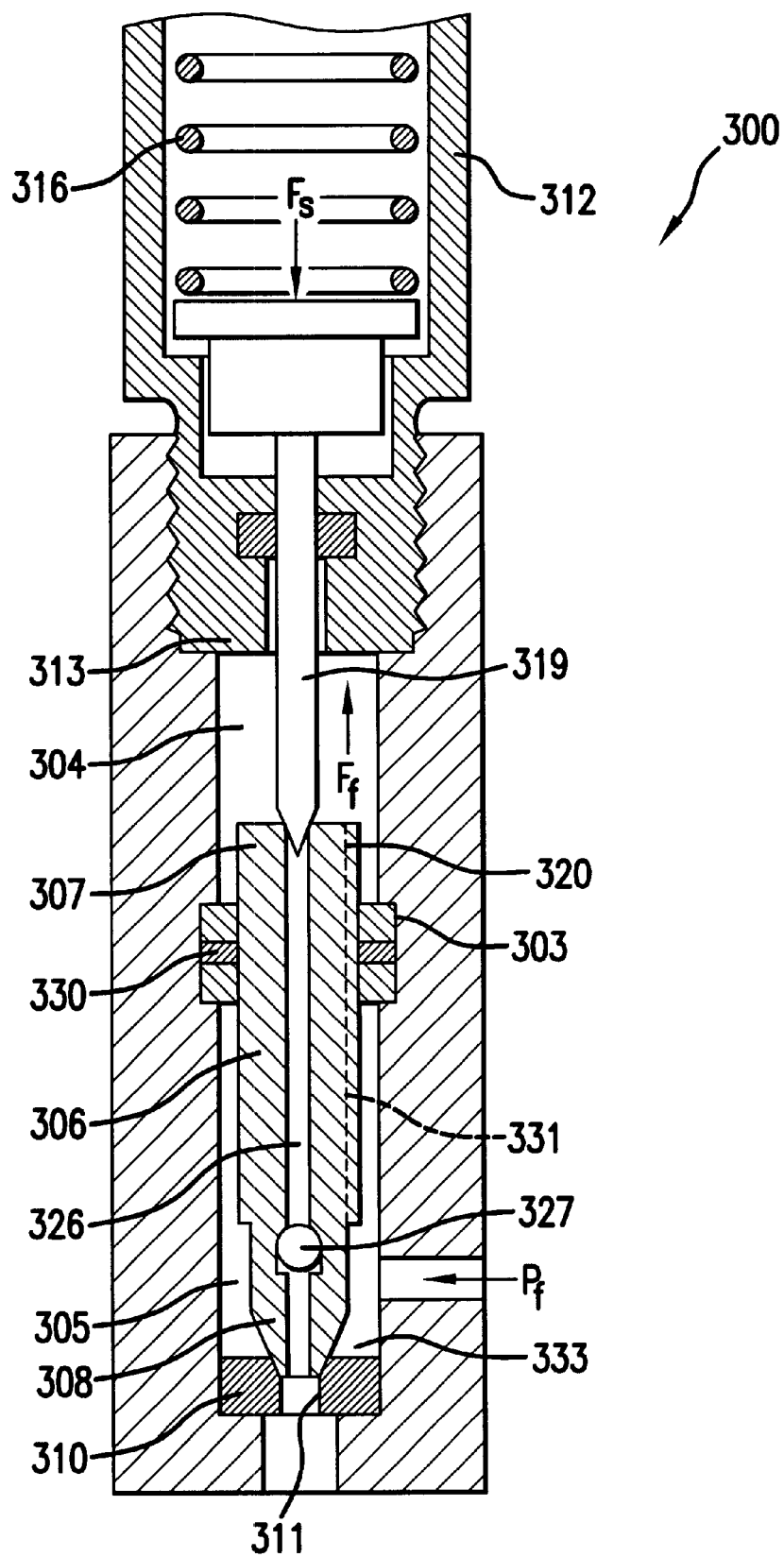
FIG. 8 is a partial cross-sectional view of an on-off valve and an actuator, according to another preferred embodiment of this invention.

To better illustrate details of this invention, valve 300 was constructed according to the embodiment shown in FIG. 7 and illustrated in part in FIG. 8. Valve 300 had valve poppet 306 straddling bushing assembly 303. Upper end 307 of valve poppet 306 was 0.312 inches in diameter and lower end 308 was 0.250 inches in diameter and mated with a tapered center hole of valve seat 310. The contact circle or the sealing circle of valve seat 310 contacting end portion 308 was about 0.188 inches in diameter.

Valve poppet 306 had central fluid passage 326 of 0.050 inches in diameter and parallel side passage 331 of 0.020 inches in diameter. Valve actuating pin 319 was 0.078 inches in diameter and had tapered end 320 for engaging a slightly tapered entrance of passage 326. The sealing circle around pin end 320 when engaged to valve poppet 306 was about 0.060 inches in diameter. When pin 319 engaged passage 326, an annular cross-sectional surface area of about 0.0016 square inches of pin 319 was exposed to the fluid in chamber 304. At the same time in chamber 305, an annular cross-sectional surface area of about 0.0487 square inches of valve poppet 306 was exposed to the pressurized fluid.

Further, valve 300 had a 0.750 inch diameter die spring 316 inside spring cylinder 312. Spring 316 had a spring rate of about 40 $lb_f$ per 0.1-inch compression. The initial compression of spring 316 during assembling was 0.05 inches, corresponding to an initial valve closing force of 20 $lb_f$ on pin 319. When water of 20,000 psi entered valve 300, the water exerted a force of 0.0016×20,000=32 $lb_f$ on pin 319. This force is greater than the 20 $lb_f$ from spring 316. Thus pin 319 was lifted. Pin 319 was then exposed fully to the water and a force of 0.0048 square inches×20,000 psi=96 $lb_f$ worked on pin 319 and pushed pin 319 out to compress spring 316. In the meantime, passage 326 was opened and water in chamber 304 quickly lost pressure as water flowed out through passage 326, check valve arrangement 327, and outlet 311. Valve poppet 306 rapidly moved up until stopped by spring cylinder end 313. The fluid force inside chamber 305 available for pushing up valve poppet 306 was estimated at 0.0487 square inches×20,000 psi=974 $lb_f$. Thus, valve poppet 306 moved up very quickly. Further, once the sealing circle around the valve seat 310 was broken, the entire cross-sectional area of the valve poppet was exposed to 20,000 psi water. Therefore, the pushing force was increased to about 1,470 $lb_f$. Check valve 327 inside valve poppet 306 prevented water from flowing back to upper chamber 304 through the larger central passage 326. Once moved up, valve poppet 306 stayed up as the water pressure equalized at its two ends. Valve 300 was then in the open position. The seal 330 prevented valve poppet 306 from dropping down. Thus there was no need for another spring inside the valve cavity to move valve poppet 306. In high-pressure applications, the valve cavity is relatively small because there may not be room for a relatively large spring around the valve poppet.

Still referring to FIG. 8, to close valve 300 required moving pin 319 back into chamber 304. A spring force greater than 96 $lb_f$ was applied to the outside end. Spring 316 was initially compressed 0.05 inches to create a downward force of 20 $lb_f$, which was subsequently canceled by the water force on pin 319. A net water force of about 96−20=76 $lb_f$ pushed pin 319 against spring 316, resulting in compression of about 0.19 inches. Thus, the total compression of spring 316 was 0.19+0.05=0.24 inches. The original overall length of spring 316 was 1.5 inches. The length of compressed spring 316 at the valve-open position was 1.5−0.24=1.26 inches.

The cam assembly of valve 300 was designed to provide a vertical travel of 0.3 inches on pin 319. When the valve lever was rotated down, the cam piston moved down 0.3 inches, thus further compressing spring 319. A spring force of about 120 $lb_f$ was generated by the 0.3-inch compression, which was sufficient to overcome the water force of 76 $lb_f$. Thus, valve poppet 306 moved down to close valve outlet 311. Once seated, the water force working on pin 319 was reduced back to 32 $lb_f$. Thus, spring 316 firmly maintained pin 319 down to close passage 326. Valve poppet 306 was held down against valve seat 310 by the water force. The net valve closure force from the water was 1470−947=523 $lb_f$, which was very substantial. Valve 300 thus stay closed. This setup of valve 300 accommodates water pressures up to about 25,000 psi. If water pressures greater than 25,000 psi are to be applied, then spring 316 must be changed. For example, a spring with a spring rate of 60 $lb_f$ per 0.10-inch compression will allow valve 300 to be operated at water pressures up to 35,000 psi. The pressure capability of valve 300 can be increased by installing a cam disk assembly having a vertical travel greater than 0.3 inches.

It was clear that valve 300 can be designed with precision to construct on-off valves suitable for use at various pressure ranges. A very high outside force can be generated through the cam assembly to provide fast valve actuation. Yet, the force acting on the valve actuating pin is isolated and controlled to protect this pin. By virtue of a floating valve poppet, a relatively large valve outlet port is possible, without sacrificing valve performance. By using water force to open and close the valve outlet port, positive valve actuations are assured. Valve 300 had all the virtues desired in an on-off valve for use with incompressible fluids such as water at very high pressures.

Figure 9:
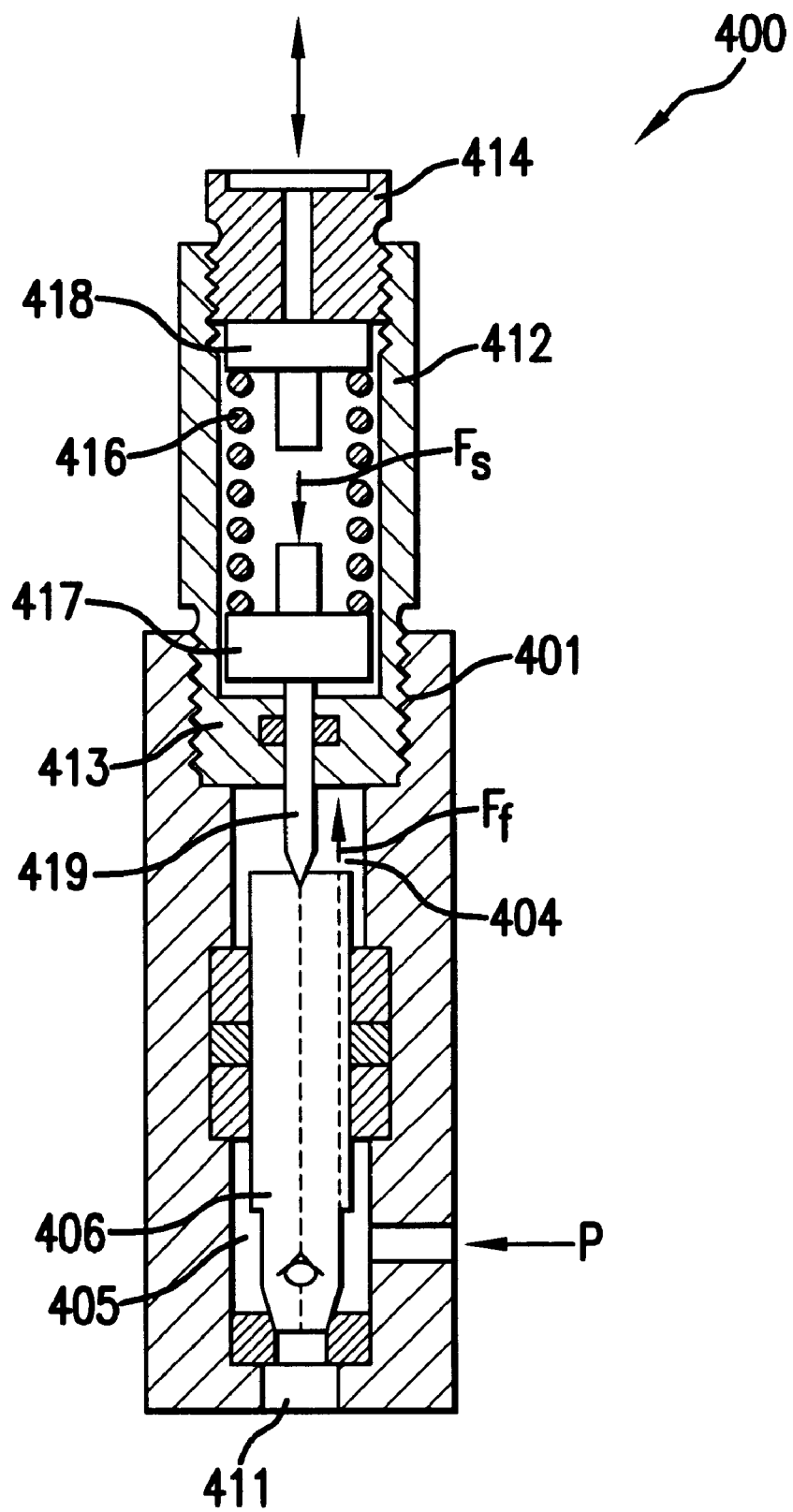
FIG. 9 is a partial cross-sectional view of an on-off valve and an actuator, according to another preferred embodiment of this invention.

FIG. 9 shows another embodiment of this invention, an improved spring-operated pressure relief valve ideally suited for use with incompressible fluids at high pressures. Valve 400 of this invention is very similar to valve 300 illustrated in FIG. 8, except that it does not have a valve actuating cam disk or lever. Instead, spring cylinder 412 has one end 413 inside valve body 401 and the other end engaged to threaded plug 414 that abuts cam piston 418, which in turn abuts compression spring 416. End plug 414 can be rotated with a screw driver or other suitable tools to compress or decompress spring 416, thus changing the spring force exerted on valve actuating pin 419. The spring force is set according to the fluid pressure inside the valve cavity.

In operation, a fluid such as water enters into valve 400 at a pressure P and flows into chambers 404 and 405. The water exerts force on and pushes pin 419 out of chamber 404, thus raising valve poppet 406 and opening outlet 411. To set valve 400, end plug 414 is moved into spring cylinder 412 to compress spring 416 until the spring force is increased to a level sufficient to move pin 419 back into chamber 404 and to push down on valve poppet 406 to close valve 400. Valve 400 is now set for fluid pressure P. When the fluid pressure in the fluid system is increased beyond fluid pressure P, pin 419 will again disengage from valve poppet 406, causing valve outlet 411 to open and fluid to be released. As a result, the fluid pressure inside valve 400 will drop and valve 400 will again close to repeat another cycle.

Figure 2:
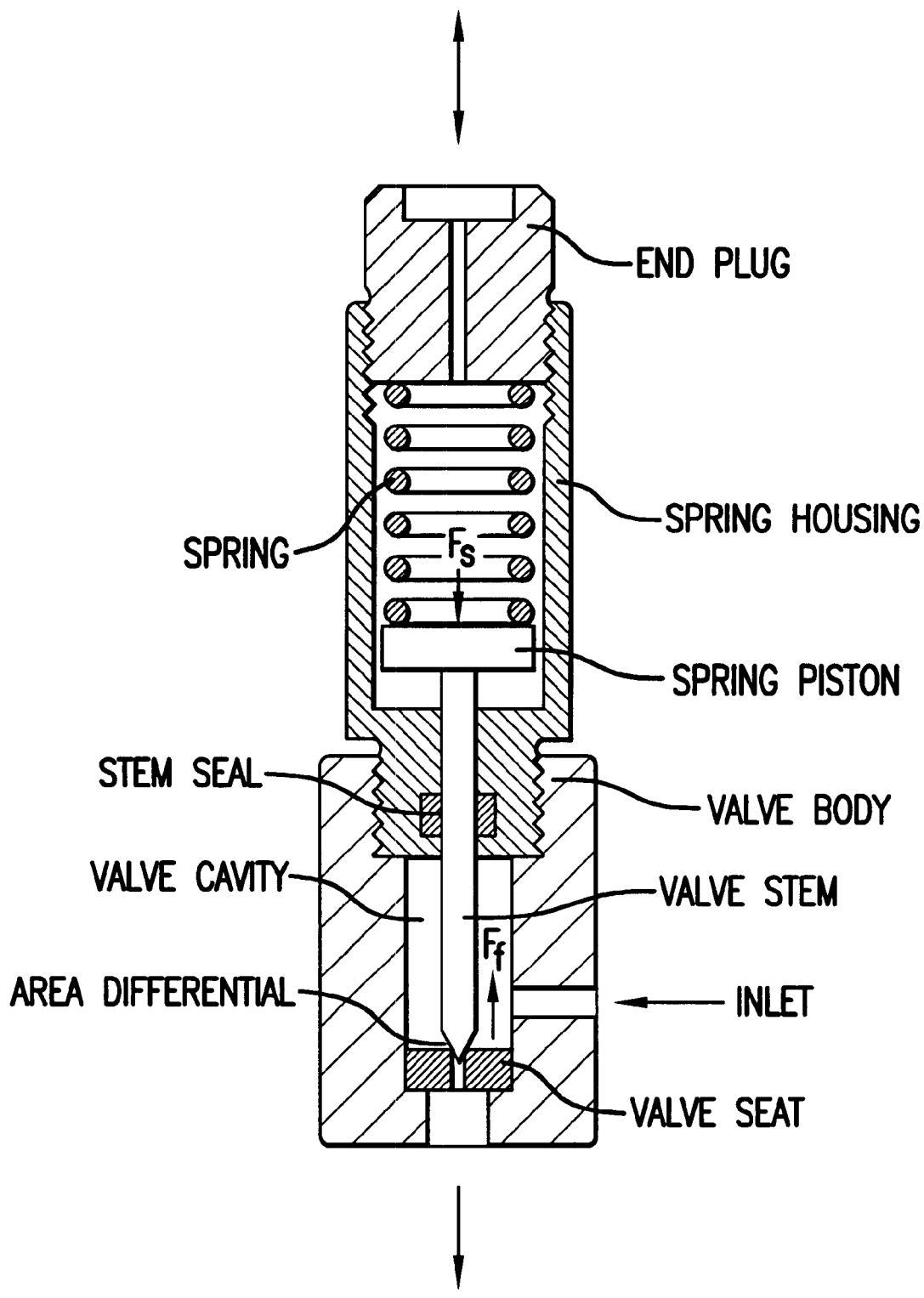
FIG. 2 is a partial cross-sectional view of a conventional on-off valve with a mechanical actuator.

Comparing valve 400 of FIG. 9 of this invention to the conventional pressure relief valve illustrated in FIG. 2 will show one difference in the presence of the floating valve poppet. In conventional valves, the spring has to be very large and powerful to handle incompressible fluid such as water at high pressures and high flow rates. The powerful spring force is applied directly to the valve stem and to the valve seat. Therefore, there is very much pounding and erosion around the tip of the valve stem and valve seat. The valve will thus have a relatively short life. As a result, spring-operated automatic pressure relief valves are rarely used for water jetting applications above 10,000 psi. Instead, rupture disks are commonly employed at the crankshaft pumps, despite their unreliable performance.

Valve 400 of this invention can be reliably used at water pressures above 20,000 psi. By using a valve actuating pin of a moderate diameter, an ordinary die spring can be used to handle water at high pressures. The situation with valve 400 is very similar to that of valve 300. For example, a 1.0 inch diameter die spring with a spring rate of 50 $lb_f$ per 0.1-inch compression can be used in valve 400 to handle water at pressures up to 35,000 psi with good sensitivity. Such performance is possible with the design of this invention.

Figure 10:
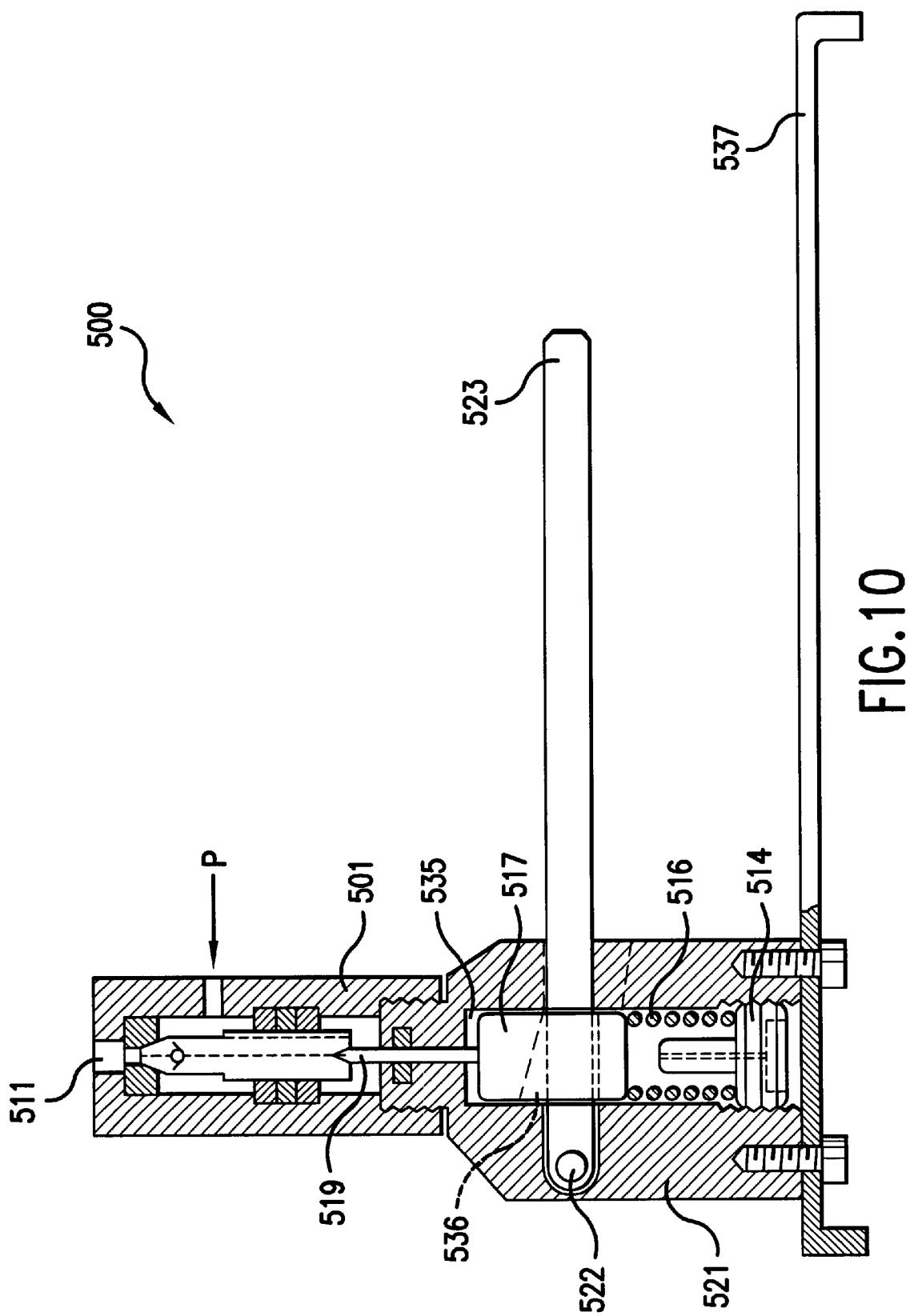
FIG. 10 is a partial cross-sectional view of an on-off valve and an actuator, according to yet another preferred embodiment of this invention.

FIG. 10 shows yet another embodiment of this invention wherein a spring-operated on-off valve is normally closed and depends on a lever-aided force to open. Valve 500 of FIG. 10 is very similar to valve 300 and valve 400, except that valve 500 is normally closed by a spring force and its opening depends on a force generated by a human hand or foot. Valve 500 has spring housing 521 attached to valve body 501 directly or indirectly in a fluid-tight manner. Spring housing 521 has cylindrical cavity 535 to accommodate spring piston 517, compression spring 516, and end plug 514. Lever 523 is anchored at one end inside spring housing 521 by anchor bolt 522 through slot 536 in spring piston 517. The other end of lever 523 extends outside of spring housing 521. Lever 523 is free to rotate around anchor bolt 522 and the rotation generates a linear travel of spring piston 517 inside cavity 535. Spring housing 521 is mounted on base 537 from which force is applied to lever 523. Base 537 can be in the form of a handle to yield a hand-operated on-off valve that is normally closed, which requires a hand force to open. Base 537 can be in the form of a plate to yield a foot-operated on-off valve. Valve 500 is different from valve 200, which is normally open. Spring piston 517 abuts valve actuating pin 519 that controls the pilot fluid circuit in a way similar to other valves of this invention. End plug 514 is used to adjust the initial compression of spring 516 required for closing valve outlet 511 at the fluid pressure P involved. When an outlet flow from valve 500 is needed, lever 523 is pulled or pressed toward base 537. When the flow is not needed, lever 523 is released.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An on-off valve operable between an open position and a closed position, the on-off valve comprising:
    a valve body having a valve cavity, an inlet and an outlet, in the open position said inlet communicating with said outlet;
    a bushing mounted with respect to said valve body and dividing said valve cavity into a first chamber and a second chamber, said bushing having a bore;
    a valve poppet slidably mounted within said valve cavity, said valve poppet positioned within said bore and having a first end portion positioned within said first chamber and a second end portion positioned within said second chamber, said second end portion sealably closing said outlet in the closed position, said valve poppet having a passage extending from said first end portion to said second end portion;
    a first bias element urging said valve poppet into said first chamber;
    an actuating pin slidably mounted with respect to said valve body, in the closed position said actuating pin sealing said passage at said first end portion of said valve poppet; and
    an actuator mounted with respect to said valve body, said actuator operating said actuating pin between the open position and the closed position.

2. The on-off valve according to claim 1 wherein said actuator comprises a spring piston connected to said actuating pin, a cam piston movably mounted with respect to said spring piston and a second bias element urging said spring piston and said cam piston apart from each other.

3. The on-off valve according to claim 2 wherein said spring piston, said cam piston and said second bias element are mounted within a void of a housing and said housing is sealably connected to said valve body.

4. The on-off valve according to claim 2 wherein said second bias element is a coil spring.

5. The on-off valve according to claim 2 wherein said actuator further comprises a cam housing mounted with respect to said valve body, a cam element movably mounted with respect to said cam housing and said cam piston mounted to ride on said cam element.

6. The on-off valve according to claim 1 wherein said actuator comprises a cam housing mounted with respect to said valve body, a cam element movably mounted with respect to said cam housing and a cam piston mounted to ride on said cam element.

7. The on-off valve according to claim 1 wherein said valve cavity is cylindrical.

8. The on-off valve according to claim 1 further comprising a valve seat mounted with respect to said valve body, said valve seat having a through bore in communication with said outlet and in the open position said through bore in communication with said second chamber.

9. The on-off valve according to claim 1 wherein at least one dimension of at least one of said bore of said bushing and said valve poppet is sized to allow a predetermined amount of a working fluid to flow from said second chamber to said first chamber.

10. The on-off valve according to claim 1 wherein said valve poppet has a second passage extending from said first chamber to said second chamber, said second passage is sized to allow a predetermined amount of a working fluid to flow from said second chamber to said first chamber.

11. The on-off valve according to claim 1 wherein said valve poppet has a first poppet end, said first bias element is a coil spring mounted around said valve poppet and said coil spring abuts said first poppet end.

12. The on-off valve according to claim 1 wherein in the open position at least a portion of said second end of said valve poppet is exposed to said second chamber.

13. The on-off valve according to claim 1 wherein said passage is positioned along a central longitudinal axis of said valve poppet.

14. The on-off valve according to claim 1 wherein said actuating pin has a converging end portion that sealably mates within said passage at said first end of said valve poppet.

15. The on-off valve according to claim 1 further comprising a one-way valve mounted within said passage of said valve poppet, and said one-way valve preventing a working fluid from flowing from said second chamber to said first chamber.

* * * * *